United States Patent [19]
Parzefall

[11] Patent Number: 4,911,277
[45] Date of Patent: Mar. 27, 1990

[54] RELEASE BEARING ASSSSEMBLY FOR A PUSH TYPE MOTOR VEHICLE CLUTCH

[75] Inventor: Walter Parzefall, Bubenreuth, Fed. Rep. of Germany

[73] Assignee: INA Walzlager Schaeffler KG, Fed. Rep. of Germany

[21] Appl. No.: 343,874

[22] Filed: Apr. 14, 1989

[30] Foreign Application Priority Data

May 18, 1988 [DE] Fed. Rep. of Germany ....... 3816890

[51] Int. Cl.$^4$ ............................................. F16D 23/14
[52] U.S. Cl. .................................... 192/98; 192/110 B
[58] Field of Search ................. 192/98, 110 B, 109 A, 192/30 V, 111 A

[56] References Cited

U.S. PATENT DOCUMENTS

| | | | |
|---|---|---|---|
| 2,703,164 | 3/1955 | Binder | 192/111 A |
| 3,376,964 | 4/1968 | Root | 192/111 A |
| 3,900,091 | 8/1975 | Maucher | 192/98 |
| 3,951,244 | 4/1976 | Neder | 192/98 |
| 4,529,076 | 7/1985 | Renaud | 192/98 |
| 4,633,993 | 1/1987 | Limbacher et al. | 192/98 |
| 4,808,015 | 2/1989 | Babcock | 192/98 X |

FOREIGN PATENT DOCUMENTS 3611602 11/1986 Fed. Rep. of Germany.
3612419 10/1987 Fed. Rep. of Germany.

Primary Examiner—Rodney H. Bonck
Attorney, Agent, or Firm—Bierman & Muserlain

[57] ABSTRACT

A release bearing assembly for a push type motor vehicle clutch, one side of which is acted upon by a clutch lever via a housing of the release bearing and against the other side of which clutch disk springs are arranged whereby the housing is axially displaceable along a guiding tube characterized in that the housing is provided with an axially displaceable sleeve, a pressure spring acts between a contact surface of the housing and a collar of the sliding sleeve and in the engaged state of the clutch, the sliding sleeve abuts against a stop face which causes the pressure spring to press the release bearing via the housing concentrically against the clutch disk springs.

10 Claims, 3 Drawing Sheets

RELEASE BEARING ASSSEMBLY FOR A PUSH TYPE MOTOR VEHICLE CLUTCH

A release bearing assembly of this type for a push type motor vehicle clutch is described in DE-OS 3,612,419 where the push type motor vehicle clutch is disengaged by the action of the clutch lever which presses upon the clutch disk springs through the release bearing. For disengaging the clutch, a force is applied through an actuating means to one end of the clutch lever and its other end is supported on a pivot which in DE-OS, 3,612,419 is designed as a dampening element to dampen vibrations of the clutch lever in the engaged state.

In known types of clutches, the release bearing is held constantly pressed against the disk springs by means of a slight preload so that the release bearing constantly rotates around the clutch, that is to say, even in the engaged state. As a result, vibrations of the crankshaft and aligning tolerances between the crankshaft and the transmission shaft as well as vibrations of the clutch disk springs are transmitted to the release bearing in the form of wobbling movements which causes increased wear of the release bearing. If a spring used for preloading is made to act upon the clutch lever eccentrically to the release bearing, the wear can be reduced only to a limited extent because then, the preload in its turn acts eccentrically upon the release bearing, which can even promote the wobbling movements of the release bearing.

In DE-OS 3,611,602, the release bearing is provided with a corrugated ring washer to give axial flexibility to the release bearing, but it is not possible to use this arrangement in the case of a release bearing assembly actuated by means of a clutch lever.

OBJECTS OF THE INVENTION

It is an object of the invention to provide a release bearing of the type initially described in which for the contact between the release bearing and the clutch disk springs, a preload which acts concentrically upon the release bearing is created.

This and other objects and advantages of the invention will become obvious from the following detailed description.

THE INVENTION

The novel release bearing assembly of the invention for a push type motor vehicle clutch, one side of which is acted upon by a clutch lever via a housing of the release bearing and against the other side of which clutch disk springs are arranged whereby the housing is axially displaceable along a guiding tube is characterized in that the housing is provided with an axially displaceable sleeve, a pressure spring acts between a contact surface of the housing and a collar of the sliding sleeve and in the engaged state of the clutch, the sliding sleeve abuts against a stop face which causes the pressure spring to press the release bearing via the housing concentrically against the clutch disk springs.

This arrangement therefore provides that in the engaged state, the preload created by the pressure spring acts concentrically on the release bearing independently of the clutch lever. By this, a defined preload between the clutch disk springs and the release bearing is obtained. The pressure spring absorb axial crankshaft vibrations and axial impacts of the clutch disk springs. By this, the wear of the release bearing is decreased on the whole and this in turn decreases the noise development in the release bearing. In the disengaged state, the pressure spring is ineffective and not loaded by the forces arising from the disengaging of the clutch.

By the provision at the housing itself of the sliding sleeve which supports the pressure spring, a single, easy-to-mount construction unit is obtained comprising the release bearing with its housing, the sliding sleeve as well as the pressure spring.

In a preferred embodiment of the invention, the sliding sleeve encloses the guiding tube and therefore requires little room. It occupies an empty space around the guiding tube which does not bring any great restriction for the length of the sliding sleeve nor therefore, for that of the pressure spring. If the guiding tube is provided with a flange, this flange forms, in a preferred embodiment of the invention, the abutting surface for the collar in the engaged state.

To assure that the sliding sleeve and with it the pressure spring are captivated at the housing of the release bearing, the sliding sleeve is provided, preferably at its end away from the collar with a shaped part lying face-to-face with an edge of the housing which lies away from the contact surface of the pressure spring whereby in the disengaged state, there is a play between the shaped part and the edge. An advantage of the described assembly is that wear of the clutch does not impair the action of the pressure spring.

In a preferred embodiment of the invention the sliding sleeve is provided with a wall which covers the pressure spring on the outside and engages in a cut-out of the housing in which it is displaceable. Thus, the pressure spring in the assembly is encapsulated. The described assembly can be used both in motor vehicle clutches with hydraulic as well as with purely mechanical actuation of the clutch lever.

Referring now to the drawings

Figure 1:
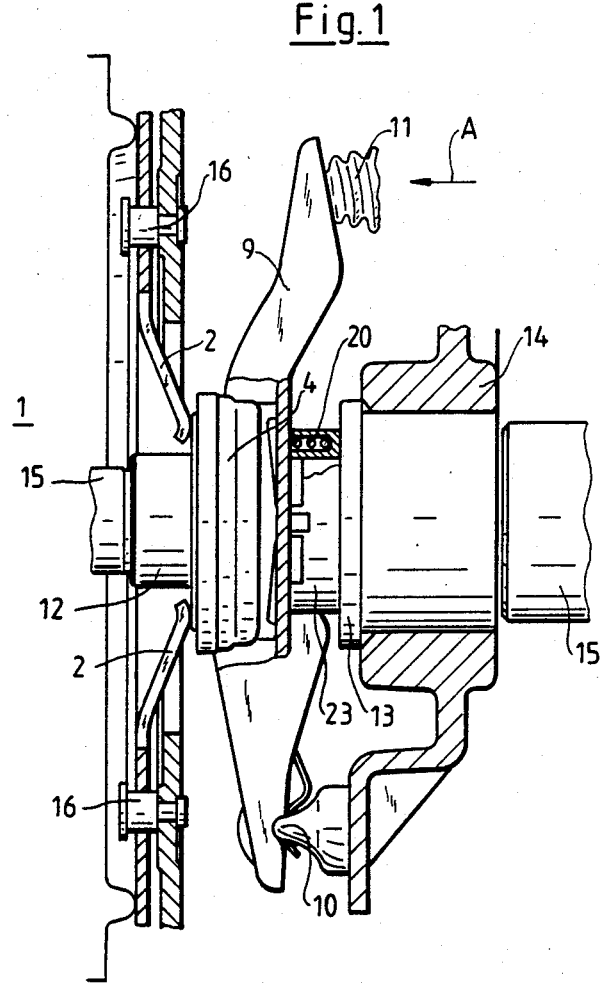
FIG. 1 is a schematic view of a motor vehicle clutch in the engaged state.

A clutch (1) with a crankshaft, not shown in the figures, is provided with rotating clutch disk springs (2) which lie against an inner raceway (3) of a release bearing (4) whose outer raceway (5) is connected with a housing (6). Between the inner raceway (3) and the outer raceway (5), rolling elements (7) are arranged. Outside against the housing (6), in a region (8) turned away from the inner raceway (3), a clutch lever (9) rests which is supported at one of its ends on a pivot (10). Its outer end is engaged by an actuating means (11). The housing (6) with the outer raceway (5) and the inner raceway (3) is displaceable with respect to a guiding tube (12) which is fixed to a gearbox case (14) by a flange (13). A transmission shaft (15) extends through the guiding tube (12) to the clutch (1).

The mode of operation of a release bearing assembly known to this extent, is essentially as follows: If the actuating means (11) presses the clutch lever (9) in the direction of the arrow (A), the clutch lever (9) displaces the housing (6) in the direction of the arrow (a). by this, the inner raceway (3) presses against the clutch disk springs (2) which causes them to swivel around their points of fixation (16). By this, the clutch (1) disengages the transmission shaft (15) from the crankshaft.

According to the invention, a sliding sleeve (17) is displaceaby mounted on the guiding tube (12) which it encloses and the sliding sleeve (17) extends all the way through between the housing (6) and the guiding tube (12) whereby the housing (6) is displaceably guided on the sliding sleeve (17). The sliding sleeve (17) is provided with a collar (18) and between the collar (18) and a contact surface (19) of the housing (6), a coiled pressure spring (20) is arranged.

Figure 2:
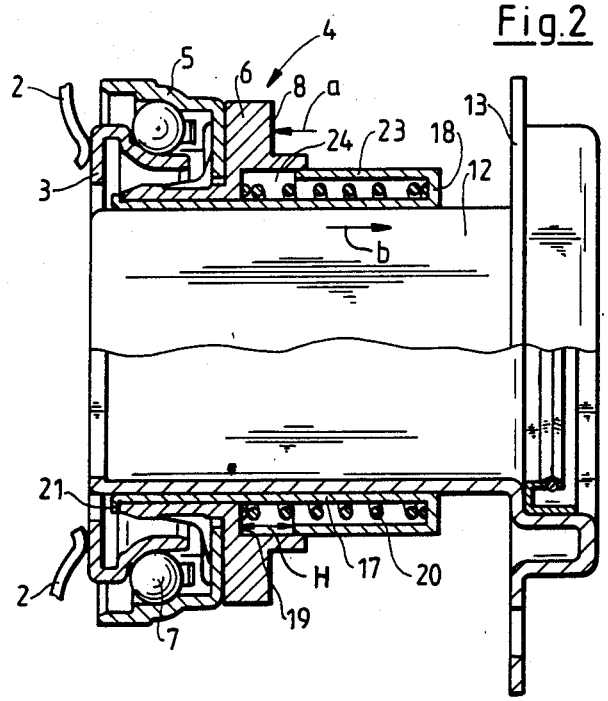
FIG. 2 is a release bearing assembly of the clutch of FIG. 1 in the disengaged state, enlarged with respect to FIG. 1.

The sliding sleeve (17) is made of steel or of a polymeric material and the sliding sleeve (17) is captivated at the housing (6) by means of a shaped part (21) lying face-to-face with an edge (22) of the housing (6) provided at the side of the housing away from the pressure spring (20). If the sliding sleeve (17) is made of steel, the shaped part (21) is a bead. If it is made of a polymeric material, the shaped part (21) can be made up of snap lugs. The sliding sleeve (17) is provided with a wall (23) covering the pressure spring (20) on the outside which wall (23) engages in a cut-out (24) of the housing (6). In the cut-out (24) there is a free travel length (H) for the wall (23) (cf. FIGS. 2 and 3).

The mode of operation of the described release bearing assembly is approximately as follows: In the disengaged state represented in FIG. 2, the collar (18) does not abut against the flange (13). The pressure spring (20) presses the sliding sleeve (17) in the direction of the arrow (b) until the shaped part (21) of the sliding sleeve (17) abuts against the edge (22) of the housing (6). The sliding sleeve (17) is thus braced against the housing (6) and cannot move freely with respect to the same. The pressure spring (20) is ineffective in the disengaged state as it is not loaded by the forces arising during disengaging. The wall (23) and the cut-out (24) are dimensioned so that the wall (23) is engaged in the cut-out (24), even when the shaped part (21) abuts against the edge (22). The pressure spring (20) thus remains encapsulated against adjacencies even in this position.

Figure 3:
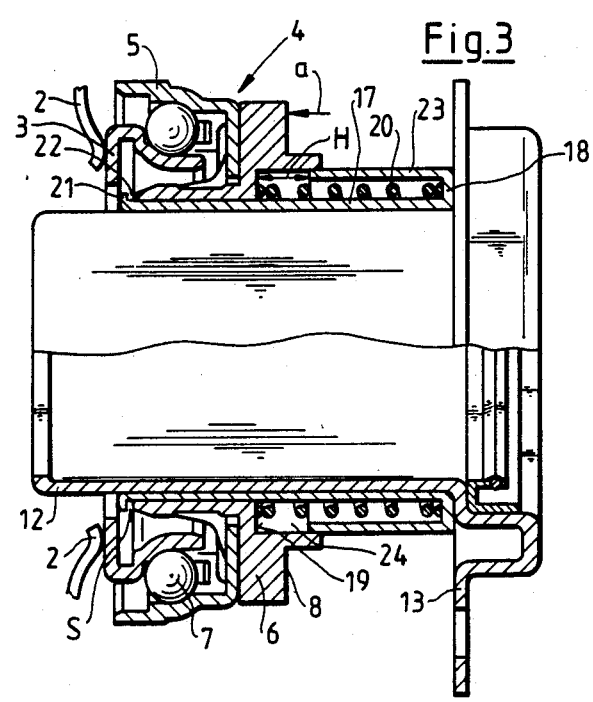
FIG. 3 shows the release bearing assembly of FIG. 2 in the engaged state and FIG. 4 shows the release bearing assembly in the engaged state with worn-out clutch facing.

In the engaged state represented in FIG. 3, the collar (18) of the sliding sleeve (17) abuts against the flange (13) which gives rise to a play (S) between the shaped part (21) and the edge (22). This play (S) is dimensioned so that it is larger than the axial impacts that have to be allowed for. In this position, the pressure spring (20) presses against the contact surface (19) of the housing (6) which as a result presses the inner raceway (3), via the outer raceway (5) and the rolling elements (7), concentrically against the clutch disk springs (2) whereby the pressure spring (20) is dimensioned so that the preload exerted by it is substantially smaller than the force of the clutch disk springs (2). The pressure spring (20) thereby dampens concentrically and directly at the housing (6), such axial vibrations as are transmitted through the clutch disk springs (2) to the inner raceway (3).

Figure 4:
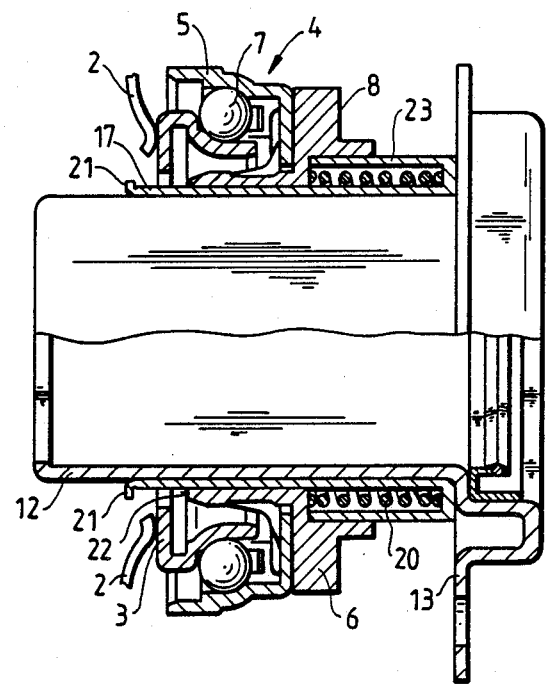

In the course of wear of the clutch facing, the clutch disk springs (2) push the housing (6) via the inner raceway (3) further in the direction of the flange (13) (cf. FIG. 4). This causes the wall (23) to penetrate deeper into the cut-out (24), thus increasing the tension of the pressure spring (20). The described assembly therefore automatically adapts itself to the wear of the clutch facing without the need of mechanical readjustment. The travel length (H) provided for the wall (23) in the cut-out (24) until the wall (23) abuts against the contact surface (19) is dimensioned so that the wall (23) strikes the contact surface (19) only when the clutch facing is completely worn out (cf. FIG. 4).

Various modifications of the elements of the invention may he made without departing from the spirit or scope thereof and it is to be understood that the invention is intended to he limited only as defined in the appended claims.

What I claim is:

1. A release hearing assembly for a push type motor vehicle clutch, one side of which is acted upon by a clutch lever via a housing of the release bearing and against the other side of which clutch disk springs are arranged whereby the housing is axially displaceable along a guiding tube characterized in that the housing is provided with an axially displaceable sliding sleeve, a pressure spring acts between a contact surface of the housing and a collar of the sliding sleeve and in the engaged state of the clutch, the sliding sleeve abuts against a stop face which causes the pressure spring to press the release hearing via the housing concentrically against the clutch disk springs.

2. A release bearing assembly of claim 1 wherein the sliding sleeve encloses the guiding tube.

3. A release hearing assembly of claim 1 wherein the guiding tube is provided with a flange and in the engaged state, the collar abuts against the flange.

4. A release bearing assembly of claim 2 wherein the guiding tube is provided with a flange and in the engaged state, the collar abuts against the flange.

5. A release bearing assembly of claim 1 wherein the sliding sleeve is provided at its end away from the collar with a shaped part lying face-to face with an edge of the housing which lies away from the contact surface of the pressure spring whereby in the disengaged state, there is a play (S) between the shaped part and the edge.

6. A release bearing assembly of claim 1 wherein the sliding sleeve is provided with a wall which covers the pressure spring on the outside and engages in a cut-out of the housing in which it is displaceable.

7. A release bearing assembly of claim 1 wherein the resilient force of the pressure spring is substantially smaller than that of the clutch disk springs.

8. A release bearing assembly of claim 1 wherein the sliding sleeve is made of steel or of a polymerlc material.

9. A release bearing assembly of claim 1 wherein the pressure spring is a coil spring arranged concentrically to the housing.

10. A release bearing assembly of claim 1 wherein in the disengaged state, the sliding sleeve is braced against the housing by the pressure spring.

* * * * *